US012689642B2

(12) United States Patent
Sumedrea et al.

(10) Patent No.: US 12,689,642 B2
(45) Date of Patent: Jul. 21, 2026

(54) THREAT EXPOSURE MANAGEMENT SYSTEM USING LARGE LANGUAGE MODELS

(71) Applicant: CrowdStrike, Inc., Sunnyvale, CA (US)

(72) Inventors: Paul Sumedrea, Bucharest (RO); Damian Monea, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 133 days.

(21) Appl. No.: 18/523,581

(22) Filed: Nov. 29, 2023

(65) Prior Publication Data

US 2025/0023893 A1     Jan. 16, 2025

Related U.S. Application Data

(60) Provisional application No. 63/513,299, filed on Jul. 12, 2023.

(51) Int. Cl.
*H04L 9/40*          (2022.01)
*G06Q 30/0201*       (2023.01)
(Continued)

(52) U.S. Cl.
CPC ..... *H04L 63/1425* (2013.01); *G06Q 30/0201* (2013.01); *H04L 41/16* (2013.01); *H04L 63/1433* (2013.01); *H04W 76/14* (2018.02)

(58) Field of Classification Search
CPC . H04L 63/20; H04L 63/1433; H04L 63/1425; H04L 63/101; H04L 41/16;
(Continued)

(56) References Cited

U.S. PATENT DOCUMENTS 9,974,111 B1 *   5/2018   Brooksby ............. H04W 76/14
2009/0259748 A1   10/2009   McClure et al.
(Continued)

FOREIGN PATENT DOCUMENTS

WO      WO-2020008433 A2 *   1/2020   ......... G06Q 30/0201

OTHER PUBLICATIONS

Wu et al., "WebIoT: Classifying Internet of Things Devices at Internet Scale through Web Characteristics," IEEE Symposium on Computers and Communication (ISCC) Jun. 30, 2022, 7 pages, 978-1-6654-9792-3, Institute for Network Sciences and Cyberspace, Tsinghua University, China.
(Continued)

*Primary Examiner* — Kyung H Shin
(74) *Attorney, Agent, or Firm* — Womble Bond Dickinson (US) LLP

(57)          ABSTRACT

A system and method of using generative AI to identify exposures of computing devices on computing networks to actual and/or potential threats. The method includes collecting a plurality of responses from a plurality of devices to a target device on a private network. The method includes providing the plurality of responses to a classification model trained to assign device descriptions for device responses based on semantic matching of the device responses to database data. The method includes assigning, by the processing device using the classification model, a plurality of device descriptions for the plurality of responses to the target device, each response is respectively associated with one or more device descriptions of the plurality of device descriptions. The method includes generating, based on the plurality of device descriptions, a status report comprising a list of network addresses associated with a group of devices having access to the target device.

18 Claims, 7 Drawing Sheets

(51) Int. Cl.
    *H04L 41/16*       (2022.01)
    *H04W 76/14*     (2018.01)

(58) Field of Classification Search
    CPC .............. H04L 63/1408; G06F 21/577; G06F
            16/9024; G06F 16/903; G06F 40/30;
         H04W 76/14; H04W 4/80; A61B 5/0022;
         A61B 5/02055; A61B 5/02053; G16H
         40/67; G06Q 30/0201; G06Q 30/0275
    See application file for complete search history.

(56)               References Cited

U.S. PATENT DOCUMENTS

2021/0021616 A1    1/2021  Shabtai et al.
2022/0286479 A1*  9/2022  Keren ..................... H04L 63/20

OTHER PUBLICATIONS

Yang et al., "Towards automatic fingerprinting of IoT devices in the cyberspace," Computer Networks Jan. 15, 2019, 10 pages, vol. 148, Elsevier B.V.
European Patent Office, Communication pursuant to Rule 69 EPC—reminder concerning payment of the designation fee (Art. 79(2) EPC) and of the examination fee (Art. 94(1) EPC)—and invitation pursuant to Rule 70a(1) EPC, dated Jan. 20, 2025 for European Patent Application No. EP 24 18 6636.7, 2 pages.
European Search Report issued for European Patent Application. No. EP 24 18 6636.7, mailed Oct. 22, 2024, 9 pages.

* cited by examiner

400

collecting a plurality of responses from a plurality of
devices to a target device on a private network
402 providing the plurality of responses to a classification
model trained to assign device descriptions for device
responses based on semantic matching of the device
responses to database data
404 assigning, by the processing device using the
classification model, a plurality of device descriptions for
the plurality of responses to the target device, each
response is respectively associated with one or more
device descriptions of the plurality of device descriptions
406 generating, based on the plurality of device descriptions, a
status report comprising a list of network addresses
associated with a group of devices having access to the
target device
408

FIG. 4

THREAT EXPOSURE MANAGEMENT SYSTEM USING LARGE LANGUAGE MODELS

CROSS-REFERENCE TO RELATED APPLICATIONS

This application claims the benefit of and priority to U.S. Provisional Application No. 63/513,299, filed on Jul. 12, 2023 and entitled "THREAT EXPOSURE MANAGE-MENT SYSTEM USING LARGE LANGUAGE MOD-ELS", which is expressly incorporated by reference herein in its entirety.

TECHNICAL FIELD

The present disclosure relates generally to cyber security, and more particularly, to systems and methods of using generative artificial intelligence (AI), such as large language models (LLMs), to identify exposures of assets, such as computing devices, on computing networks to actual and/or potential threats.

BACKGROUND

Cybersecurity is the practice of protecting critical systems and sensitive information from digital attacks. Cybersecurity techniques are designed to combat threats against networked systems and applications, whether those threats originate from inside or outside of an organization.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a flow diagram depicting a method of using generative artificial intelligence to identify exposures of computing devices on computing networks to actual and/or potential threats, according to some embodiments.

DETAILED DESCRIPTION

Figure 1:
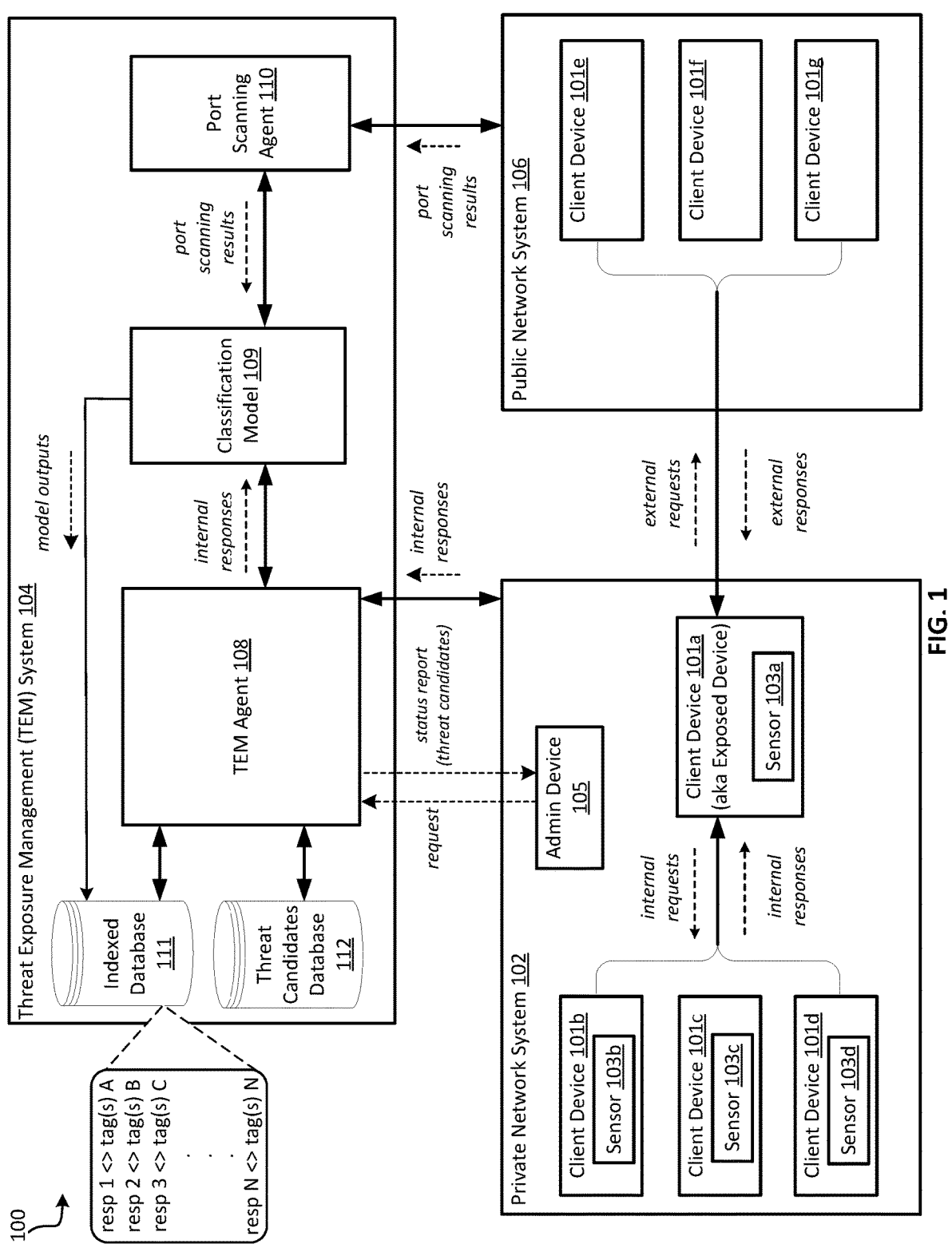
FIG. 1 is a block diagram depicting an example environment for using generative artificial intelligence to identify exposures of computing devices on computing networks to actual and/or potential threats, according to some embodiments.

An asset cloud is a centralized digital storage facility that operates over the internet. The vast majority of businesses today use either cloud software or cloud services for keeping track of company equipment, also referred to assets. An asset includes the hardware (e.g., computing devices, data-bases, and/or the like), software (e.g., applications, firewalls, and/or the like), and networking entities (e.g., routers, switches, and/or the like) that a company has as tools and resources for their objectives. External Attack Surface Man-agement (EASM) tools constantly uncover internet exposed assets belonging to customers while querying exposed ports from the entire addressable Internet. These EASM tools iteratively query the entire addressable internet by trying to send requests over all possible ports by leveraging the most used protocols. Each time they get a valid response (as opposed to an error message), this equates to a port being open and accessible and thus an asset being exposed. Indeed, not all assets are exposed accidentally because some of them might serve a specific purpose.

To identify the specific assets that are accidentally exposed, one must analyze the response they get back to a particular request and study its contents (e.g., the contents of a Hyper Text Transfer Protocol Secure (HTTP/S) response). This is a slow process often resulting in severe inaccuracies because Internet Protocol (IP) addresses change dynami-cally over time, and there is a time delta between the moment an item is discovered and the time it can be processed. Consequently, an asset that is discovered at a particular IP address might not be at that IP address a few moments later, so the asset can no longer be directly assigned to an asset inside a customer's environment. Some conventional systems have tried to use regex rules to churn through these responses but have failed because of the difficulty of analyzing large sets of unstructured data.

For these reasons, assigning assets to a particular cus-tomer and being able to flag the issue to the appropriate customer is still a difficult problem for the conventional EASM systems. Moreover, explaining what exact asset needs to be fixed and what team it belongs to is also a hard problem to solve, especially if the company and/or team name is not explicitly written in the retrieved response.

Aspects of the present disclosure address the above-noted and other deficiencies by using generative artificial intelli-gence (e.g., LLMs, Recurrent Neural Network, text gener-ating model based on diffusion techniques) to identify exposures of computing devices on computing networks to actual and/or potential threats. Although the present disclo-sure is applicable to various types of artificial intelligence models, for simplicity, the remainder of this disclosure will describe the present embodiments using LLMs. That is, any type of artificial intelligence model may be used in place of an LLM in any of the present embodiments.

The present disclosure provides a mechanism for using an LLM which takes as input a plurality of responses gathered from a pass over the addressable internet and is able to generate a set of assignments/explanations for each of these responses containing information meant to help attribute an exposed asset to a set of topics. These topics can directly represent potential customers, or they can describe business verticals/industry segments as well as the specific depart-ment of a particular organization whose confidential data are exposed on the internet and many others. The generated output can either help to directly attribute a particular response to a specific customer and department or it can help narrow down the pool of customers to go over and manually/semi-automatically check given any particular information the system can extract around them from the response (e.g., business sector, business size, organizational culture, country of origin, document topics, document types, languages used, asset type, asset functionality etc.). Additionally the same assignment can be periodically constructed from within the customer's environment such as when the time to match devices (e.g., mobile phones, s3 buckets, servers, etc.) from within an organization to devices identified from outside that organizations' environment, the matching process could be done almost instantaneously either by matching on the same topics/descriptions given to a particular asset or via embeddings generated for these assets based on available information. Moreover, given a list of assets for which the customer would like to investigate the external attack surface, an LLM agent could appropriately assign these assets to external discovered assets based on their characteristics. If additional protocols want to be tested out, an LLM can also help with generating code to create some request which follow the desired protocol's format and structure. Customers could also benefit from a breakdown of their exposed assets by department in order to be able to enforce proactive measures and additional training in the parts of the organization which stand to benefit most from them. Being able to correlate information from both inside and outside the organization based on the content exposed to the internet also represents another way in which internet exposed assets can be assigned to particular customers In an illustrative embodiment, a threat exposure management (TEM) system collects a plurality of responses from a plurality of devices to a target device on a private network. The TEM provides the plurality of responses to a classification model (e.g., LLM) trained to assign device descriptions for device responses based on semantic matching of the device responses to database data. Each device description may indicate one or more of a company name, a business vertical, a device type (e.g., smartphone, laptop, and/or the like), or a department name. The TEM assigns, using the classification model, a plurality of device descriptions for the plurality of responses to the target device. Each response is respectively associated with one or more device descriptions of the plurality of device descriptions. The TEM generates, based on the plurality of device descriptions, a status report that includes a list of network addresses that are associated with a group of devices that have access to the target device. A device has access to the target device if the device can communicate with the target device, access a storage of the target device, and/or use the access rights/privileges (e.g., rights to access secured data and/or resources) of the target device. In other words, the status report identifies the exposures that the target device has to actual and/or potential threats as a result of being connected to one or more computing networks.

FIG. 1 is a block diagram depicting an example environment for using generative artificial intelligence to identify exposures of computing devices on computing networks to actual and/or potential threats, according to some embodiments. The environment 100 includes and/or executes a threat exposure management (TEM) system (sometimes referred to as External Attack Surface Management Investigator) 104, a private network system 102 (e.g., a corporate network, a local area network (LAN), a wide area network (WAN), a personal area network (PAN)) and a public network system 106 (e.g., the internet). The private network system 102 includes client devices 101 (e.g., client device 101a, 101b, 101c, 101d) and an administrative device 105 (shown in FIG. 1 as admin device) that are communicably coupled together via a private communication network of the private network system 102. The public network system 106 includes client devices 101 (e.g., client devices 101e, 101f, 101g) that are communicably coupled together via a public communication network of the public network system 106. The client devices 101 of the private network system 102, the administrative device 105 of the private network system 102, and the client devices 101 of the public network system 106 are each communicably coupled to the TEM system 104.

The TEM system 104 includes and/or executes a TEM agent 108, a classification model 109, a port scanning agent 110, an indexed database 111, and a threat candidates database 112. The TEM agent 108 stores, in the indexed database 111, a plurality of device responses that are each respectively associated (e.g., linked) with one or more device descriptions (e.g., tags, labels). For example, FIG. 1 shows that the indexed database 111 includes response 1 (abbreviated as resp 1) that is linked to a first set of tags ("tags A"); response 2 that is linked to a second set of tags ("tags B"); response 3 that is linked to a third set of tags ("tags C"); and up to response N that is linked to an nth set of tags ("tags N").

The TEM agent 108 stores, in the threat candidates database 112, a plurality of threat candidates that each indicate one or more network addresses of devices that have access to one or more client devices 101 (client device 101a) of the private network system 102. In some embodiments, the classification model 190 may be a large language model (LLM) that uses generative AI techniques. An LLM is, for example, deep learning algorithms that can recognize, summarize, translate, predict, and/or generate content using very large datasets.

In some embodiments, the TEM agent 108 deploys a sensor onto each of the client devices 101 of the private network system 102 by sending (e.g., broadcasting) messages to the client devices 101. The messages cause the client devices 101 to install the sensor onto its own resources (e.g., memory, storage, processor). For example, client device 101a installs sensor 103a, client device 101b installs sensor 103b, client device 101c installs sensor 103c, and client device 101d installs sensor 103d (each collectively referred to as, sensors 103).

In some embodiments, the TEM agent 108 does not need to deploy a sensor onto each of the client device 101, but instead can leverage an already existing and deployed sensor 103 which is also configured to send the necessary telemetry data for the TEM agent 108 to function.

A client device 101 on the private network system 102 may send a request (shown in FIG. 1 as internal request) to one or more client devices 101 (client devices 101b-101d) of the private network system 102 to cause each of the client devices 101b-101d to send a response (shown in FIG. 1 as internal response) back to client device 101a. A client device 101 on the private network system 102 may also send a request (shown in FIG. 1 as external request) to one or more client devices 101 (client devices 101e-101f) of the public network system 106 to cause each of the client devices 101e-101f to send a response (shown in FIG. 1 as external response) back to client device 101a.

Each sensor 103 is configured to monitor (e.g., track) and detect each communication (e.g., transmission/transmit, reception/receive) between the client device 101 in which the sensor 103 is installed and the other client devices 101 on the private network system 102 and/or the public network system 106. Each communication includes a header (e.g., source network address, destination network address, and/or the like) and a message body (e.g., text, code, etc.). The sensor 103 also assigns a time stamp to each communication and records (e.g., stores) the communication in a local storage (e.g., memory, database, cache) of the respective client device 101. Therefore, each client device 101 may use its sensor 103 to keep track of network addresses (e.g., internet protocol (IP) address, Media Access Control (MAC) address, telephone number, and/or the like) of the client devices 101 on the private network system 102 and/or the public network system 106 that are currently communication with the client device 101 and/or have previously communicated (sometimes referred to as historical communication) with the client device 101.

Each of the client devices 101 (client devices 101a-101d) of the private network system 102 periodically sends its locally stored records of communication to the TEM agent 108, which in turn, stores the records of communication in the indexed database 111. Again, the stored records of communication that the TEM agent 108 receives from a particular client device (e.g., client device 101a) include (a) the requests and responses that the particular client device has sent to and received from other client devices (e.g., client devices 101b-101d) in the private network system 102, and/or (b) the requests and responses that the particular client device has sent to and received from other client devices (e.g., client devices 101e-101g) in the public network system 106.

The port scanning agent 110 may perform a port scanning of the public network system 106 across one or more communication protocols (e.g., Hyper Text Transfer Protocol Secure (HTTP/HTTPS), File Transfer Protocol (FTP), Remote Procedure Call (RPC), and/or the like) to discover the network addresses of one or more client devices 101 that are currently connected to the public network of the public network system 106. These "online" devices may also be simultaneously connected to the private network system 102. For example, client device 101a may have a first connection to the private network of the private network system 102 and a second connection to the public network of the public network system 106.

The TEM agent 108, in some embodiments, uses training data to train the classification model 109 to generate and/or assign device descriptions (e.g., tags, descriptions, labels) for device responses based on semantic matching of the device responses to database data. The training data may include a portion or all portions of the database data of the indexed database 111 and/or the threat candidates database 112. The TEM agent 108 may then use the classification model 109, now trained, to generate and/or assign device descriptions for the records of communication (e.g., requests, responses) that the TEM agent 108 receives from the client device 101.

A communication network (e.g., private communication network of private network system 102 and/or public communication network of public network system 106) may include a wired or a wireless infrastructure, which may be provided by one or more wireless communications systems, such as wireless fidelity (Wi-Fi) connectivity to the communication network and/or a wireless carrier system that can be implemented using various data processing equipment, communication towers (e.g., cell towers), etc. The communication network may carry communications (e.g., data, message, packets, frames, etc.) between any other the computing device.

Still referring to FIG. 1, the TEM agent 108 collects a plurality of responses from a plurality of client devices 101 to the client device 101a (e.g., sometimes referred to as, target device) on the private network system 102. The TEM agent 108 provides the plurality of responses to a classification model 109 trained to assign device descriptions for device responses based on semantic matching of the device responses to data stored in a database (e.g., indexed database 111, and/or threat candidates database 112). Each device description may indicate one or more of a company name, a business vertical, a device type, or a department name. The TEM agent 108 assigns, using the classification model, a plurality of device descriptions for the plurality of responses to the client device 101a. Each response is respectively associated with one or more device descriptions of the plurality of device descriptions.

The TEM agent 108 generates, based on the plurality of device descriptions, a status report that includes a list of network addresses that are associated with a group of devices that have access to the client device 101a. The TEM agent 108 may generate a status report that excludes the client devices 101 that once had access to the client device 101a, but no longer does at the time of generating the status report. For example, the TEM agent 108 generates the status report by identifying, based on the port scanning results, one or more offline devices that are associated with one or more responses of the plurality of responses. The TEM agent 108 excludes one or more network addresses of the one or more offline devices from the list of network addresses. A device has access to the client device 101a if the device can communicate with the client device 101a, access a storage of the client device 101a, and/or use the access rights/ privileges (e.g., rights to access secured data and/or resources) of the client device 101a.

The TEM agent 108 may generate one or more natural language strings including the one or more device descriptions of the plurality of device descriptions. The TEM agent 108 may include the one or more natural language strings in the status report. In some embodiments, the TEM agent 108 may include the one or more device descriptions of the plurality of device descriptions in the status report in a list format, instead of a natural language format.

Although FIG. 1 shows only a select number of computing devices (e.g., TEM system 104, client devices 101, admin devices 105) and private network systems; the environment 100 may include any number of computing devices and private network systems that are interconnected in any arrangement to facilitate the exchange of data between the computing devices and the private network systems.

Figure 2A:
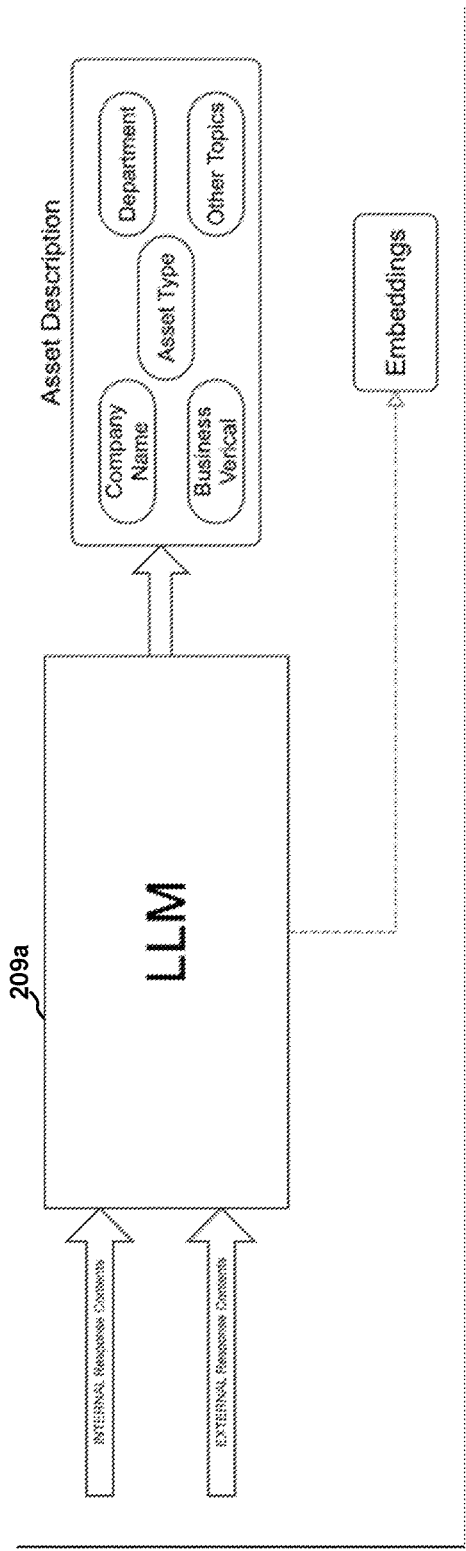
FIG. 2A is a block diagram depicting an example environment for training a classification model to generate and assign device descriptions to device responses based on semantic matching of the device responses to database data, according to some embodiments.

FIG. 2A is a block diagram depicting an example environment for training a classification model to generate and assign device descriptions to device responses based on semantic matching of the device responses to database data, according to some embodiments. Each of the components in FIG. 1B may be included in the TEM system 104 in FIG. 1. For example, the LLM 209a may correspond to the classification model 109 in FIG. 1. The internal response contents may correspond to the internal responses discussed with respect to FIG. 1, and the external response contents may correspond to external response discussed with respect to FIG. 1. The TEM agent 108 trains the LLM 209a to generate and/or assign device descriptions for device responses based on semantic matching of the device responses to database data. The training data may include a portion or all portions of the database data of the indexed database 111 and/or the threat candidates database 112.

Figure 2B:
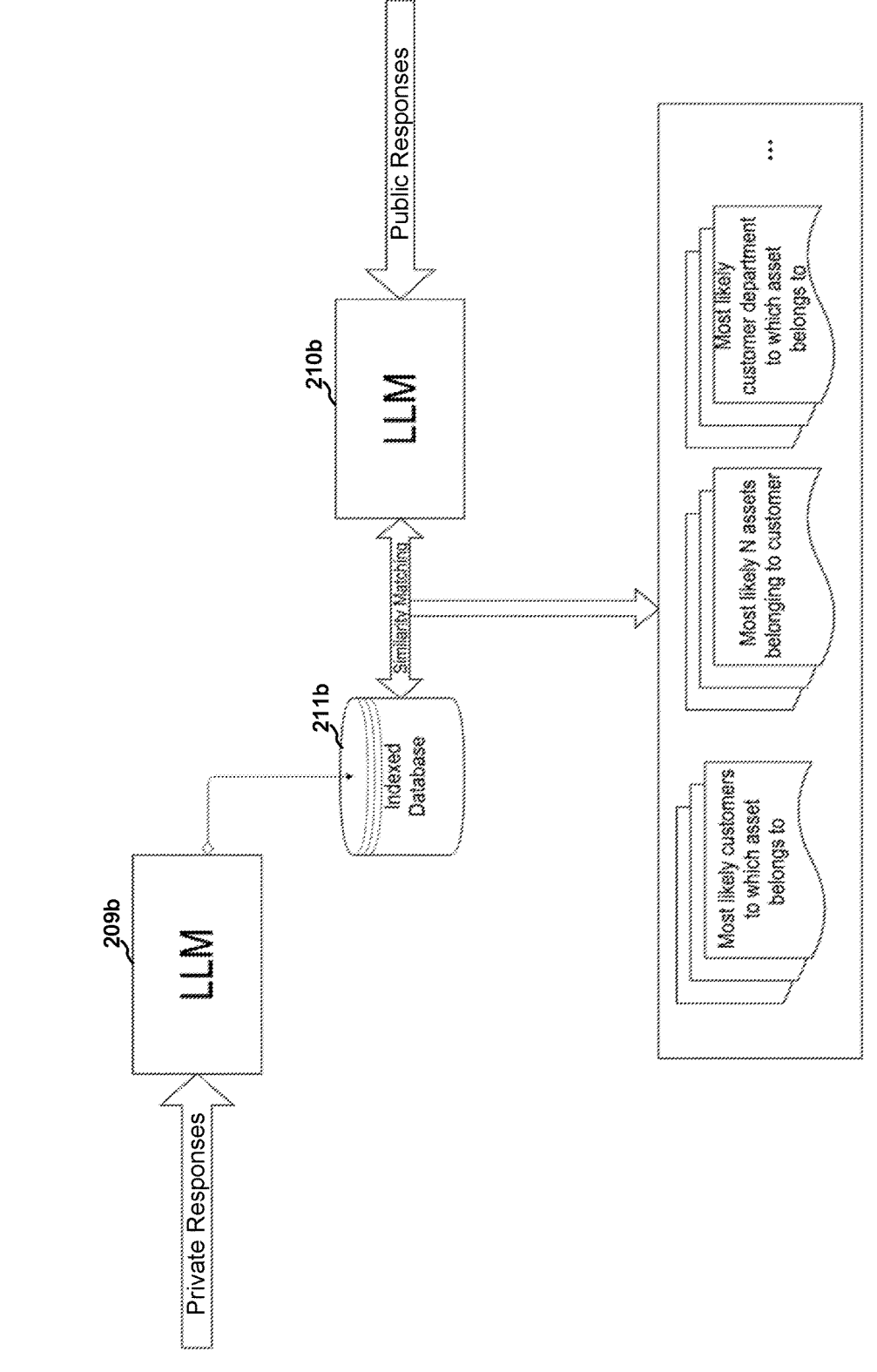
FIG. 2B is a block diagram depicting an example environment for using the LLM model in FIG. 2A to identify exposures of computing devices on computing networks to actual and/or potential threats, according to some embodiments.

FIG. 2B is a block diagram depicting an example environment for using the LLM in FIG. 2A to identify exposures of computing devices on computing networks to actual and/or potential threats, according to some embodiments. Each of the components in FIG. 2B may be included in the TEM system 104 in FIG. 1. For example, the LLM 209 may correspond to the classification model 109 in FIG. 1. In some embodiments, the TEM system 104 may use a single LLM to process the private responses and the public responses. In some embodiments, LLM 209 and/or LLM 210b may correspond to LLM 109 in FIG. 1. A public response may be a response that originates from a client device (e.g., any of client devices 101e-101g) that is connected to the public network system 106. A private response may be a response that originates from a client device (e.g., any of the client devices 101b-101d) that is connected to the private network system 102. In some embodiments, the TEM system 104 may use a first LLM 209b to process the private responses and a second LLM 210b to process the public responses.

The one or more LLMs store their outputs in the indexed database 211b (e.g., indexed database 111 in FIG. 1), the TEM agent 108 in FIG. 1 is used to generate one or more threat candidates. As shown in FIG. 1, the threat candidates may include an indication of one or more customers most likely (e.g., top x-number of customers) to be associated with the client device 101a, an indication of one or more customer departments most likely to be associated with the client device 101a; and/or an indication of one or more customer devices most likely belonging to the one or more customers. The TEM agent 108 includes the threat candidates in a status report.

Figures 3A, 3B:
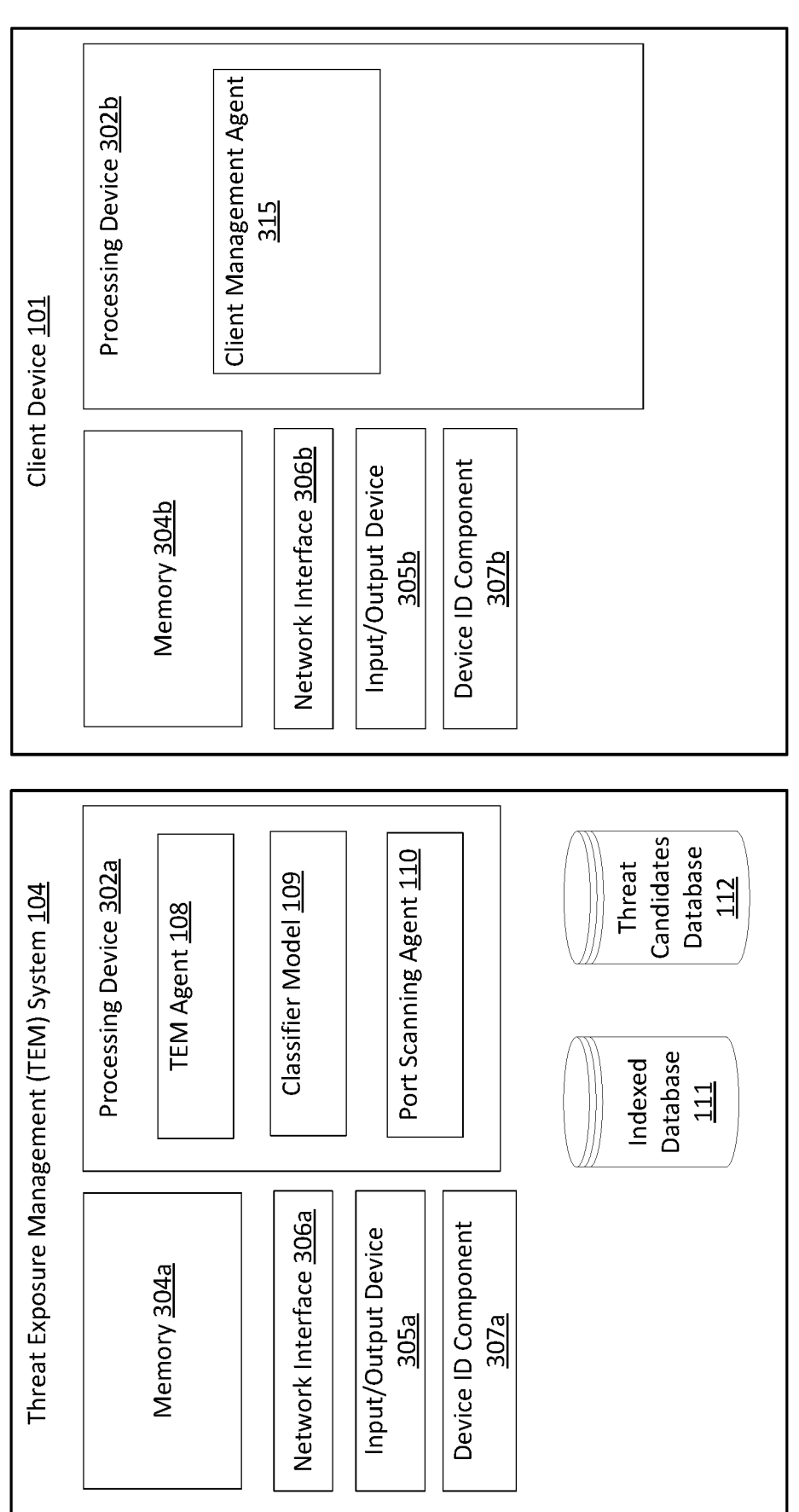
FIG. 3A is a block diagram depicting an example of the threat exposure management (TEM) system in FIG. 1, according to some embodiments.
FIG. 3B is a block diagram depicting an example of the client device in FIG. 1, according to some embodiments.

FIG. 3A is a block diagram depicting an example of the threat exposure management (TEM) system in FIG. 1, according to some embodiments. While various devices, interfaces, and logic with particular functionality are shown, it should be understood that the TEM system 104 includes any number of devices and/or components, interfaces, and logic for facilitating the functions described herein. For example, the activities of multiple devices may be combined as a single device and implemented on the same processing device (e.g., processing device 302a), as additional devices and/or components with additional functionality are included.

The TEM system 104 includes a processing device 302a (e.g., general purpose processor, a PLD, etc.), which may be composed of one or more processors, and a memory 304a (e.g., synchronous dynamic random-access memory (DRAM), read-only memory (ROM)), which may communicate with each other via a bus (not shown).

The processing device 302a may be provided by one or more general-purpose processing devices such as a microprocessor, central processing unit, graphic processing unit (GPU), or the like. In some embodiments, processing device 302a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 302a may include one or more special-purpose processing devices such as an application specific integrated circuit (ASIC), a field programmable gate array (FPGA), a digital signal processor (DSP), network processor, or the like. The processing device 302a may be configured to execute the operations described herein, in accordance with one or more aspects of the present disclosure, for performing the operations and steps discussed herein.

The memory 304a (e.g., Random Access Memory (RAM), Read-Only Memory (ROM), Non-volatile RAM (NVRAM), Flash Memory, hard disk storage, optical media, etc.) of processing device 302a stores data and/or computer instructions/code for facilitating at least some of the various processes described herein. The memory 304a includes tangible, non-transient volatile memory, or non-volatile memory. The memory 304a stores programming logic (e.g., instructions/code) that, when executed by the processing device 302a, controls the operations of the TEM system 104. In some embodiments, the processing device 302a and the memory 304a form various processing devices and/or circuits described with respect to the TEM system 104. The instructions include code from any suitable computer programming language such as, but not limited to, C, C++, C #, Java, JavaScript, VBScript, Perl, HTML, XML, Python, TCL, and Basic.

The processing device 302a executes a TEM agent 108, a classification model 109, and a port scanning agent 110. The TEM system 104 includes an indexed database 111 and a threat candidates database 112. In some embodiments, any of the TEM agent 108, the classification model 109, and the port scanning agent 110 may be combined into a single entity that includes the functions and features of its individual parts.

The TEM agent 108 may be configured to collect a plurality of responses from a plurality of client devices 101 that are sent to the client device 101a (e.g., target device) on the private network system 102. For example, the TEM agent 108 may send a request to the client device 101a (e.g., a target device) to cause the client device 101a to perform a port scanning procedure on its own ports to discover one or more assets (and their corresponding device identifier, such as a MAC address and/or IP address) that have access to the client device 101a. An asset (e.g., a client device) has access to the client device 101a if the asset can communicate (e.g., send and/or receive messages) with the client device 101a. The client device 101a sends the results of the port scanning procedure to the TEM agent 108.

The TEM agent 108 may be configured to provide the plurality of responses to the classification model 109. The TEM agent 108 may be configured to train the classification model 109 to assign device descriptions for client device 101 responses based on semantic matching of the device responses to database data. The TEM agent 108 may be configured to assign, using the classification model 109, a plurality of device descriptions for the plurality of responses to the client device 101a. In some embodiments, each response is respectively associated with one or more device descriptions of the plurality of device descriptions. The TEM agent 108 may be configured to generate, based on the plurality of device descriptions, a status report that includes a list of network addresses associated with a group of devices (e.g., client device 101) having access to the client device 101a.

In some embodiments, client device 101b (e.g., a first client device) of the plurality of client devices 101 communicates with the client device 101a via the private network system 102 and a second device of the plurality of client devices 101 communicates with the client device 101a via the public network system 106.

In some embodiments, the TEM agent 108 may be configured to collect a plurality of responses from a plurality of client devices 101 to a client device 101 on the private network system 102 by deploying one or more sensors 103 to the private network system 102 to be used by the plurality of client devices 101 to monitor communication between the client device 101a and the plurality of client devices 101 and send the plurality of responses to the TEM agent 108.

In some embodiments, the TEM agent 108 may be configured to collect a plurality of responses from a plurality of client devices 101 to a client device 101 on the private network system 102 by performing a port scanning across a plurality of communication protocols (e.g., Hypertext Transfer Protocol (HTTP), Hypertext Transfer Protocol Secure (HTTPS), and the like) to discover a plurality of online devices (e.g., client device 101) that are connected to at least one of the public network system 106 or the private network system 102.

The TEM agent 108 may be configured to generate, based on the plurality of device descriptions, a status report by identifying, based on the port scanning, one or more offline devices (e.g., client device 101) that are associated with one or more responses of the plurality of responses; and excluding one or more network addresses of the one or more offline devices from the from the list of network addresses.

The TEM agent 108 may be configured to maintain, in a database, a plurality of historical device descriptions that are associated with a plurality of historical responses from a plurality of sending devices (e.g., client device 101) to a plurality of receiving devices (e.g., client device 101) on the private network system 102 and a public network system 106. In some embodiments, each historical response of the plurality of historical responses is respectively associated with one or more historical device descriptions of the plurality of device descriptions and/or one or more device descriptions of the plurality of device descriptions.

In some embodiments, the classification model 190 may be an LLM that uses generative AI techniques. An LLM is, for example, deep learning algorithms that can recognize, summarize, translate, predict, and/or generate content using very large datasets.

In some embodiments, the plurality of device descriptions indicate at least one of a company name, a business vertical, a device type, or a department name. In some embodiments, the status report includes an indication of one or more customers most likely to be associated with the target device. In some embodiments, the status report includes an indication of one or more customer departments most likely to be associated with the target device. In some embodiments, the status report includes an indication of one or more customer devices most likely belonging to the one or more customers.

The TEM agent 108 may be configured to receive a request (shown in FIG. 1 as, request) from the admin device 105 for information indicating exposures of the client device 101a on the private network system 102. The TEM agent 108 may be configured to generate the status report using the techniques described herein and then provide the status report to admin device 105. In some embodiments, the TEM agent 108 sends the status report to the client device 101a to notify the client device 101a (including a user of the client device 101a) about the group of devices that have access to the client device 101. That is, the status report notifies the admin device 105 and/or the client device 101a about the security vulnerabilities associated with the client device 101.

The TEM agent 108 may be configured to generate one or more natural language strings that include the one or more device descriptions of the plurality of device descriptions. The TEM agent 108 may be configured to include the one or more natural language strings in the status report.

The TEM system 104 includes a network interface 306a configured to establish a communication session with a computing device for sending and receiving data over the communication network 120 to the computing device. Accordingly, the network interface 306a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the TEM system 104 includes a plurality of network interfaces 306a of different types, allowing for connections to a variety of networks, such as local area networks (public or private) or wide area networks including the Internet, via different sub-networks.

The TEM system 104 includes an input/output device 305a configured to receive user input from and provide information to a user. In this regard, the input/output device 305a is structured to exchange data, communications, instructions, etc. with an input/output component of the TEM system 104. Accordingly, input/output device 305a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the TEM system 104, such as a built-in display, touch screen, microphone, etc., or external to the housing of the TEM system 104, such as a monitor connected to the TEM system 104, a speaker connected to the TEM system 104, etc., according to various embodiments. In some embodiments, the TEM system 104 includes communication circuitry for facilitating the exchange of data, values, messages, and the like between the input/output device 305a and the components of the TEM system 104. In some embodiments, the input/output device 305a includes machine-readable media for facilitating the exchange of information between the input/output device 305a and the components of the TEM system 104. In still another embodiment, the input/output device 305a includes any combination of hardware components (e.g., a touchscreen), communication circuitry, and machine-readable media.

The TEM system 104 includes a device identification component 307a (shown in FIG. 3A as device ID component 307a) configured to generate and/or manage a device identifier associated with the TEM system 104. The device identifier may include any type and form of identification used to distinguish the TEM system 104 from other computing devices. In some embodiments, to preserve privacy, the device identifier may be cryptographically generated, encrypted, or otherwise obfuscated by any device and/or component of the TEM system 104. In some embodiments, the TEM system 104 may include the device identifier in any communication (e.g., classifier performance data, input message, parameter message, etc.) that the TEM system 104 sends to a computing device.

The TEM system 104 includes a bus (not shown), such as an address/data bus or other communication mechanism for communicating information, which interconnects the devices and/or components of the TEM system 104, such as processing device 302a, network interface 306a, input/output device 305a, and device ID component 307a.

In some embodiments, some or all of the devices and/or components of TEM system 104 may be implemented with the processing device 302a. For example, the TEM system 104 may be implemented as a software application stored within the memory 304a and executed by the processing device 302a. Accordingly, such embodiment can be implemented with minimal or no additional hardware costs. In some embodiments, any of these above-recited devices and/or components rely on dedicated hardware specifically configured for performing operations of the devices and/or components.

FIG. 3B is a block diagram depicting an example of the client device in FIG. 1, according to some embodiments. While various devices, interfaces, and logic with particular functionality are shown, it should be understood that the client device 101 includes any number of devices and/or components, interfaces, and logic for facilitating the functions described herein. For example, the activities of multiple devices may be combined as a single device and implemented on a same processing device (e.g., processing device 302b), as additional devices and/or components with additional functionality are included.

The client device 101 includes a processing device 302b (e.g., general purpose processor, a PLD, etc.), which may be composed of one or more processors, and a memory 304b (e.g., synchronous dynamic random-access memory (DRAM), read-only memory (ROM)), which may communicate with each other via a bus (not shown). The processing device 302b includes identical or nearly identical functionality as processing device 302a in FIG. 3A, but with respect to devices and/or components of the client device 101 instead of devices and/or components of the TEM system 104.

The memory 304b of processing device 302b stores data and/or computer instructions/code for facilitating at least some of the various processes described herein. The memory 304b includes identical or nearly identical functionality as memory 304a in FIG. 3A, but with respect to devices and/or components of the client device 101 instead of devices and/or components of the TEM system 104.

The processing device 202a executes a client management agent 315. In some embodiments, the client management agent 315 may be configured to receive a message from the TEM system 104, where the message includes information about installing a sensor 103. In response to receiving the message, the client management agent 315 uses the message to install the sensor onto its own resources (e.g., memory, storage, processor). In some embodiments, the TEM system 104 does not need to deploy a sensor onto each of the client devices 101, but instead can leverage an already existing and deployed sensor which is also configured to send the necessary telemetry data for the TEM system 104 to function. The client management agent 315 may be configured to use the installed sensor 103 to record (in a local storage, e.g., memory, hard drive, and/or the like) communication that takes place between the particular client device 101 (in which the sensor 103 is installed) and other client devices 101 that communicate with the particular client device 101. The client management agent 315 may be configured to periodically send its locally stored records of communication to the TEM system 104, which in turn, stores the records of communication in the indexed database 111.

The client management agent 315 of a particular client device (e.g., client device 101a) may be configured to send a request (shown in FIG. 1 as internal request) to one or more client devices of the client devices 101b-101d of the private network system 102 to cause each of the client devices 101b-101d to send a response (shown in FIG. 1 as internal response) back to client device 101a. The client device 101a on the private network system 102 may also be configured to send a request (shown in FIG. 1 as external request) to one or more of the client devices 101e-101f of the public network system 106 to cause each of the client devices 101e-101f to send a response (shown in FIG. 1 as external response) back to client device 101a.

The client device 101 includes a network interface 306b configured to establish a communication session with a computing device for sending and receiving data over a network to the computing device. Accordingly, the network interface 306b includes identical or nearly identical functionality as network interface 306a in FIG. 3A, but with respect to devices and/or components of the client device 101 instead of devices and/or components of the TEM system 104.

The client device 101 includes an input/output device 305b configured to receive user input from and provide information to a user. In this regard, the input/output device 305b is structured to exchange data, communications, instructions, etc. with an input/output component of the client device 101. The input/output device 305b includes identical or nearly identical functionality as input/output device 305a in FIG. 3A, but with respect to devices and/or components of the client device 101 instead of devices and/or components of the TEM system 104.

The client device 101 includes a device identification component 307b (shown in FIG. 3B as device ID component 307b) configured to generate and/or manage a device identifier associated with the client device 101. The device ID component 307b includes identical or nearly identical functionality as device ID component 307a in FIG. 3A, but with respect to devices and/or components of the client device 101 instead of devices and/or components of the TEM system 104.

The client device 101 includes a bus (not shown), such as an address/data bus or other communication mechanism for communicating information, which interconnects the devices and/or components of the client device 101, such as processing device 302b, network interface 306b, input/output device 305b, and device ID component 307b.

In some embodiments, some or all of the devices and/or components of the client device 101 may be implemented with the processing device 302b. For example, the client device 101 may be implemented as a software application stored within the memory 304b and executed by the processing device 302b. Accordingly, such an embodiment can be implemented with minimal or no additional hardware costs. In some embodiments, any of these above-recited devices and/or components rely on dedicated hardware specifically configured for performing operations of the devices and/or components.

Figure 3C:
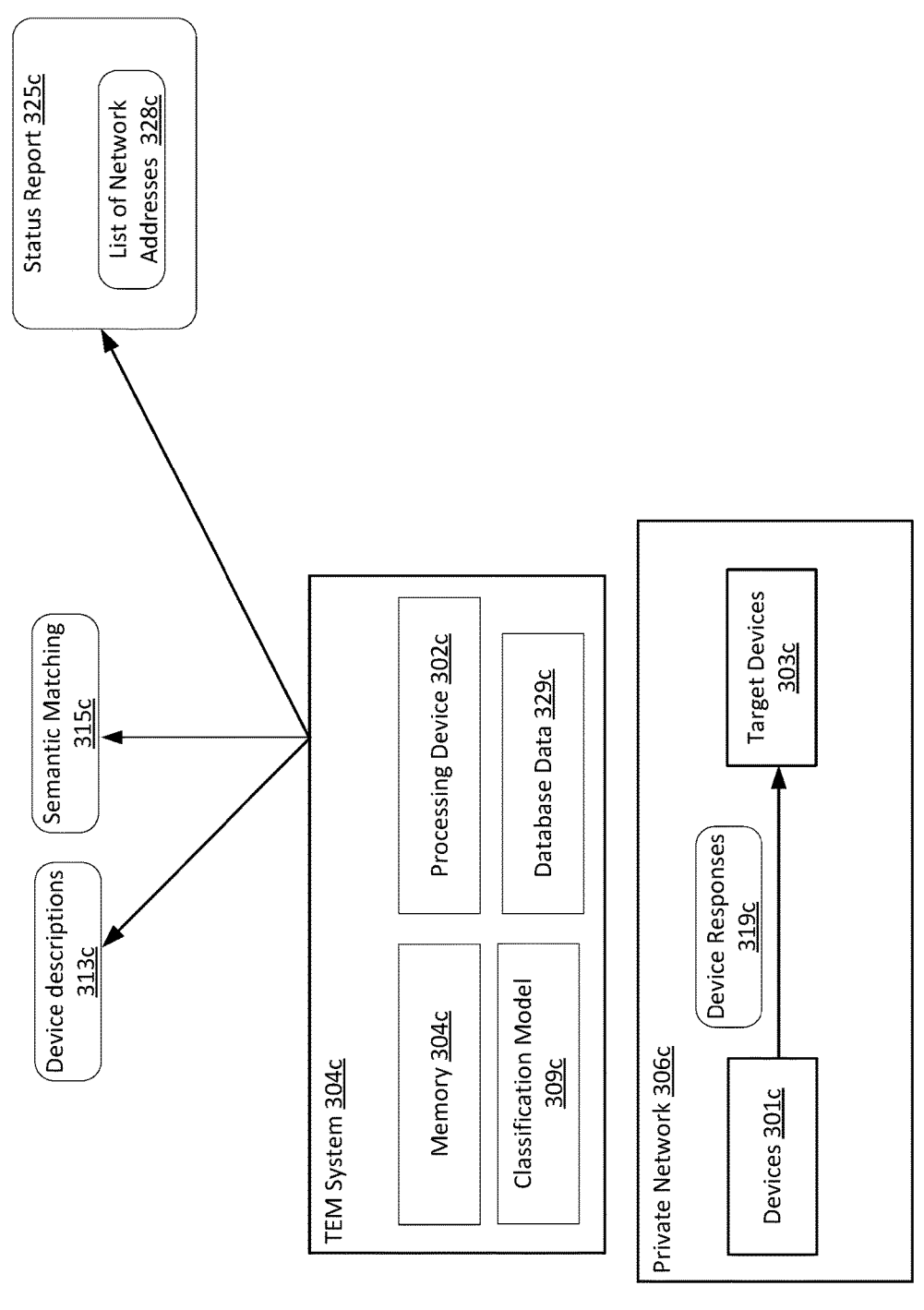
FIG. 3C is a block diagram depicting an example environment for using the TEM in FIG. 1, according to some embodiments.

FIG. 3C is a block diagram depicting an example environment for using the TEM in FIG. 1, according to some embodiments. The TEM system 104 includes a memory 304c and a processing device 302c that is operatively coupled to the memory 304c. The processing device 302c is collect a plurality of responses 319c from a plurality of devices 301c to a target device 303c on a private network 306c. The processing device 302c is configured to provide the plurality of responses 319c to a classification model 309c that is trained to assign device descriptions 313c for device responses 319c based on semantic matching 315c of the device responses 319c to database data 329c. The processing device 302c is configured to assign, using the classification model 309c, a plurality of device descriptions 313c for the plurality of responses 319c to the target device 303c. In some embodiments, each response is respectively associated with one or more device descriptions 313c of the plurality of device descriptions 313c. The processing device 302c is configured to generate, based on the plurality of device descriptions 313c, a status report 325c that includes a list of network addresses 328c that are associated with a group of devices 301c that have access to the target device 303c.

FIG. 4 is a flow diagram depicting a method of using generative artificial intelligence to identify exposures of computing devices on computing networks to actual and/or potential threats, according to some embodiments. Method 400 may be performed by processing logic that may include hardware (e.g., circuitry, dedicated logic, programmable logic, a processor, a processing device, a central processing unit (CPU), graphic processing unit (GPU), a system-on-chip (SoC), etc.), software (e.g., instructions running/executing on a processing device), firmware (e.g., microcode), or a combination thereof. In some embodiments, method 300 may be performed by a threat exposure management system, such as the TEM system 104 in FIG. 1. In some embodiments, method 400 may be performed by one or more computing devices of a private network system, such as private network system 102 in FIG. 1. In some embodiments, method 400 may be performed by one or more computing devices of a public network system, such as public network system 106 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

The method 400 includes the block 402 of collecting a plurality of responses from a plurality of devices to a target device on a private network. The method 400 includes the block 404 of providing the plurality of responses to a classification model trained to assign device descriptions for device responses based on semantic matching of the device responses to database data. The method 400 includes the block 406 of assigning, by the processing device using the classification model, a plurality of device descriptions for the plurality of responses to the target device, each response is respectively associated with one or more device descriptions of the plurality of device descriptions. The method 400 includes the block 408 of generating, based on the plurality of device descriptions, a status report including a list of network addresses associated with a group of devices having access to the target device.

Figure 5:
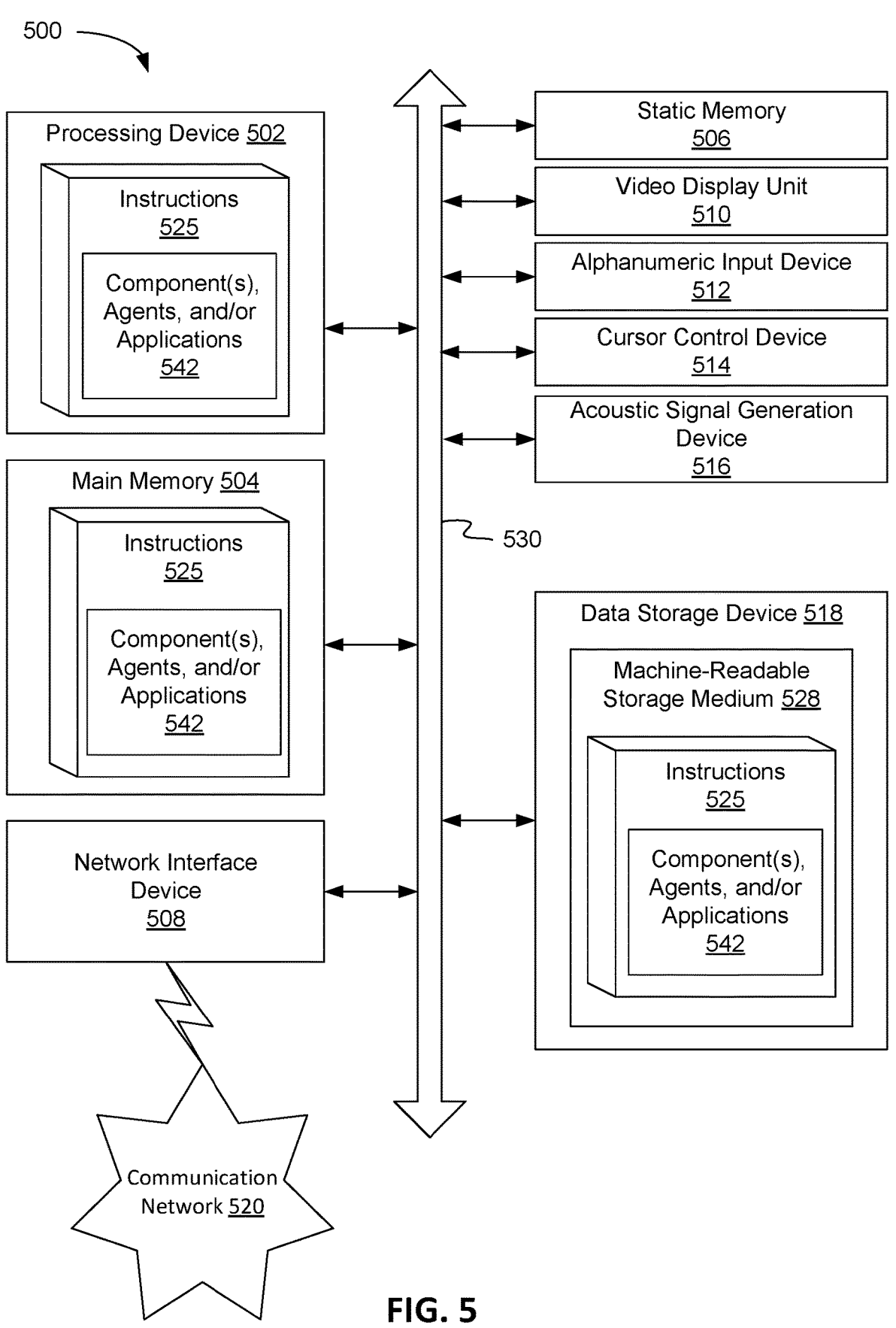
FIG. 5 is a block diagram of an example computing device that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components/programs/applications 542 (e.g., TEM agent 108, classification model 109, port scanning agent 110 in FIG. 1, etc.) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "collecting," "providing," "assigning," "generating," "receiving," "maintaining," "identifying," "selecting," "deploying," "performing," "identifying," "excluding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:

collecting a plurality of responses from a plurality of devices to a target device on a private network by performing a port scanning across a plurality of communication protocols to discover a plurality of online devices that are connected to at least one of a public network or the private network;

providing the plurality of responses to a classification model trained to assign device descriptions for device responses based on semantic matching of the device responses to database data;

assigning, by a processing device using the classification model, a plurality of device descriptions for the plurality of responses to the target device, each response is respectively associated with one or more device descriptions of the plurality of device descriptions;

ranking a plurality of customer departments based on which customer departments are most likely to be associated with the target device; and generating, based on the plurality of device descriptions, a status report comprising both a list of network addresses associated with a group of devices having access to the target device and an indication of one or more customer departments of the plurality of customer departments most likely to be associated with the target device, wherein generating the status report further comprises identifying, based on the port scanning, a first offline device using a first communication protocol to provide a first response of the plurality of responses and a second offline device using a second communication protocol that is different from the first communication protocol to provide a second response of the plurality of responses.

2. The method of claim 1, wherein a first device of the plurality of devices communicates with the target device via the private network and a second device of the plurality of devices communicates with the target device via a public network.

3. The method of claim 1, wherein the plurality of responses are gathered by one or more sensors that monitor communication between the target device and the plurality of devices.

4. The method of claim 1, wherein generating, based on the plurality of device descriptions, the status report further comprises: excluding one or more network addresses of the one or more offline devices from the list of network addresses.

5. The method of claim 1, further comprising:
maintaining, in a database, a plurality of historical device descriptions associated with a plurality of historical responses from a plurality of sending devices to a plurality of receiving devices on the private network and a public network, each historical response of the plurality of historical responses is respectively associated with one or more historical device descriptions of the plurality of device descriptions and one or more device descriptions of the plurality of device descriptions.

6. The method of claim 1, wherein at least one of:
the classification model corresponds to a large language model (LLM); or
the plurality of device descriptions indicate at least one of a company name, a business vertical, a device type, or a department name.

7. The method of claim 1, wherein the status report further comprises at least one or more of:
an indication of one or more customers most likely to be associated with the target device; or
an indication of one or more customer devices most likely belonging to the one or more customers.

8. The method of claim 1, further comprising:
receiving a request for information indicating exposures of the target device on the private network; and
providing the status report to a different device on the private network.

9. The method of claim 1, further comprising:
generating one or more natural language strings comprising the one or more device descriptions of the plurality of device descriptions; and
including the one or more natural language strings in the status report.

10. A system comprising:
a memory; and
a processing device, operatively coupled to the memory, to:
collect a plurality of responses from a plurality of devices to a target device on a private network by performing a port scanning across a plurality of communication protocols to discover a plurality of online devices that are connected to at least one of a public network or the private network;
provide the plurality of responses to a classification model trained to assign device descriptions for device responses based on semantic matching of the device responses to database data;
assign, using the classification model, a plurality of device descriptions for the plurality of responses to the target device, each response is respectively associated with one or more device descriptions of the plurality of device descriptions;
rank a plurality of customer departments based on which customer departments are most likely to be associated with the target device; and
generate, based on the plurality of device descriptions, a status report comprising both a list of network addresses associated with a group of devices having access to the target device and an indication of one or more customer departments of the plurality of customer departments most likely to be associated with the target device, wherein to generate the status report, the processing is further to identify, based on the port scanning, a first offline device using a first communication protocol to provide a first response of the plurality of responses and a second offline device using a second communication protocol that is different from the first communication protocol to provide a second response of the plurality of responses.

11. The system of claim 10, wherein a first device of the plurality of devices communicates with the target device via the private network and a second device of the plurality of devices communicates with the target device via a public network.

12. The system of claim 10, wherein the plurality of responses are gathered by one or more sensors that monitor communication between the target device and the plurality of devices.

13. The system of claim 10, wherein to generate, based on the plurality of device descriptions, the status report, the processing device is further to: exclude one or more network addresses of the one or more offline devices from the list of network addresses.

14. The system of claim 10, wherein the processing device is further to:
maintain, in a database, a plurality of historical device descriptions associated with a plurality of historical responses from a plurality of sending devices to a plurality of receiving devices on the private network and a public network, each historical response of the plurality of historical responses is respectively associated with one or more historical device descriptions of the plurality of device descriptions and one or more device descriptions of the plurality of device descriptions.

15. The system of claim 10, wherein at least one of:
the classification model corresponds to a large language model (LLM); or
the plurality of device descriptions indicate at least one of a company name, a business vertical, a device type, or a department name.

16. The system of claim 10, wherein the status report further comprises at least one or more of:
an indication of one or more customers most likely to be associated with the target device; or an indication of one or more customer devices most likely belonging to the one or more customers.

17. The system of claim 10, wherein the processing device is further to at least one of:

receive a request for information indicating exposures of the target device on the private network, and provide the status report to a different device on the private network; or generate one or more natural language strings comprising the one or more device descriptions of the plurality of device descriptions, and include the one or more natural language strings in the status report.

18. A non-transitory computer-readable medium storing instructions that, when execute by a processing device, cause the processing device to:

collect a plurality of responses from a plurality of devices to a target device on a private network by performing a port scanning across a plurality of communication protocols to discover a plurality of online devices that are connected to at least one of a public network or the private network;

provide the plurality of responses to a classification model trained to assign device descriptions for device responses based on semantic matching of the device responses to database data;

assign, by the processing device using the classification model, a plurality of device descriptions for the plurality of responses to the target device, each response is respectively associated with one or more device descriptions of the plurality of device descriptions;

rank a plurality of customer departments based on which customer departments are most likely to be associated with the target device; and generate, based on the plurality of device descriptions, a status report comprising both a list of network addresses associated with a group of devices having access to the target device and an indication of one or more customer departments of the plurality of customer departments most likely to be associated with the target device, wherein generating the status report further comprises identifying, based on the port scanning, a first offline device using a first communication protocol to provide a first response of the plurality of responses and a second offline device using a second communication protocol that is different from the first communication protocol to provide a second response of the plurality of responses.

* * * * *